(12) United States Patent
Braun

(10) Patent No.: US 7,325,581 B2
(45) Date of Patent: Feb. 5, 2008

(54) APPARATUS FOR PUNCHING AND WELDING OR BONDING WORKPIECES

(75) Inventor: Hans-Dieter Braun, Frittlingen (DE)

(73) Assignee: Maschinenfabrik Spaichingen GmbH, Spaichingen (DE)

( * ) Notice: Subject to any disclaimer, the term of this patent is extended or adjusted under 35 U.S.C. 154(b) by 230 days.

(21) Appl. No.: 11/103,263

(22) Filed: Apr. 11, 2005

(65) Prior Publication Data

US 2005/0223549 A1 Oct. 13, 2005

(30) Foreign Application Priority Data

Apr. 13, 2004 (DE) .................... 10 2004 018 309

(51) Int. Cl.
| | |
|---|---|
| B29C 65/12 | (2006.01) |
| B29C 65/74 | (2006.01) |
| B35H 29/00 | (2006.01) |
| B32B 38/04 | (2006.01) |
| B32B 38/10 | (2006.01) |
| B60R 19/04 | (2006.01) |

(52) U.S. Cl. .................... 156/513; 156/556; 29/795; 293/155

(58) Field of Classification Search ................ 156/513, 156/556, 518, 514; 29/795, 799; 293/155
See application file for complete search history.

(56) References Cited

U.S. PATENT DOCUMENTS 3,855,840 A * 12/1974 Kawano .................... 72/418

| 6,305,678 | B1 | 10/2001 | Hammersmith et al. |
| 6,409,438 | B1 | 6/2002 | Kohler |
| 2002/0040525 | A1* | 4/2002 | Himsl et al. ............ 29/897.2 |
| 2002/0100534 | A1 | 8/2002 | Distel |
| 2003/0034657 | A1* | 2/2003 | Garcia et al. ............ 293/102 |
| 2004/0118897 | A1 | 6/2004 | Caldarone et al. |

FOREIGN PATENT DOCUMENTS

| CA | 2 411 633 | 5/2003 |
| DE | 43 03 916 | 8/1994 |
| DE | 100 30 997 | 1/2001 |
| DE | 100 46 451 A1 | 3/2002 |
| EP | 0 496 995 | 8/1992 |
| GB | 1 583 950 | 2/1981 |
| SU | 921 787 | 4/1982 |

* cited by examiner

*Primary Examiner*—Philip Tucker
*Assistant Examiner*—Sing P. Chan
(74) *Attorney, Agent, or Firm*—Michael J. Striker

(57) ABSTRACT

A combined punching and welding or punching and bonding apparatus for workpieces (1), e.g. bumpers of motor vehicles, is described. The apparatus has a punching station (3) having at least one punching yoke (4), a welding or bonding station having at least one welding or bonding tool, and a shuttle table (21) which is able to be moved between the stations and carries a workpiece holder (22). In accordance with the invention, the punching yoke (4) and the welding or bonding tools are arranged to be stationary whereas the holder (22) is mounted to be movable up and down on the shuttle table (21) (FIG. 2).

9 Claims, 3 Drawing Sheets

APPARATUS FOR PUNCHING AND WELDING OR BONDING WORKPIECES

FIELD OF THE INVENTION

The invention relates to an apparatus for punching and welding or bonding workpieces, and particularly plastics parts for motor vehicles, comprising a punching station having at least one punching yoke at which a die and a punch are provided, a welding or bonding station having at least one welding or bonding tool, and a shuttle table, able to be moved to and fro between the punching station and the welding or bonding station, on which is mounted a holder intended for the workpieces to rest solidly thereon.

BACKGROUND OF THE INVENTION

Apparatuses of this kind, which are also referred to as punching/welding machines, are used as a preference in the manufacture of bumpers, produced from plastics material, for the automobile industry. The object in this case is for example to provide the bumpers with holes by punching in a first pass. After this, in a second pass, parts for receiving various additional items are to be inserted in these holes and fastened in place in them by welding or bonding. The additional items may for example be parking sensors, headlight cleaning systems, trailer hitches, exhaust systems or trim strips. As dictated by the particular case, the holes may comprise closed circular holes, or cutouts, open at the edge, of cross-sections which depend in each case on the particular application. The fastening of the receiving parts in the holes can be effected by ultrasonic or laser welding or the like or also by bonding.

Because of the two passes which belong together, it is usual to provide an apparatus of the kind referred to above and having combined therein punching and welding/bonding means. These are so designed that, with the shuttle table moved forward to a front end of the apparatus or machine, the bumpers are inserted manually into the holder mounted on the table, whereupon the shuttle table is moved, by a motor or the like, to a punching yoke which is arranged at the rear end of the apparatus, for the requisite holes first to be punched there. Following this, the shuttle table is moved back to the front end for the requisite receiving parts, which have previously been placed on delivery spigots arranged in the welding space, to be inserted into the holes which have been punched and then fastened in place in them.

Because of the manual insertion of the bumpers in the holder and of the receiving parts on spigots or the like intended for them on the holder, it is desirable for the holder to be arranged at an ergonomically advantageous height above the ground. In particular, the holder should not be arranged at too high a level, so that the operator does not have to lift the bumpers or other large workpieces to a position which can only be reached with inconvenience.

Something that militates against an ergonomically advantageous heightwise position of this kind for the holder is the fact that bumpers are in most cases parts of U-shaped cross-section which have to be inserted in the holder with the opening of the U facing downwards. Before the shuttle table can be moved to the punching station, the welding or bonding tools therefore have to be withdrawn downwards from the U-shaped space in the bumper inserted in the holder. After this, the shuttle table can be moved to the punching station. Because the shuttle table moves along a substantially horizontal path, the die in the punching yoke has to be situated in a lowered position when this happens so that the leading side-wall of the bumper, which forms the U-shape, can get past it. After this, the punching yoke has to be raised in order to apply the die to the underside of the bumper from below and thereby to support the bumper during the punching operation. Because in addition the punching axes are usually situated in radial positions relative to the arched surfaces of the bumper and the axes along which the punching yokes move are therefore situated at different angles in space, each punching yoke requires a reciprocating arrangement of its own to perform the movements described when there are a plurality of holes to be punched. The length of reciprocating travel has to be at least sufficiently great in this case as to be equal to the height of the side-walls of the bumpers, which means that sufficient space has to be left for it. After this, similar conditions arise at the front end of the apparatus at the welding/bonding station because there, all the tools required for welding or bonding likewise first have to be brought up against the bumpers from below and on completion of the welding or bonding operation have to be withdrawn again from the path of the bumpers.

As a result of these circumstances it has, to date, been necessary for the holders for the bumpers to be arranged at a certain minimum height which is not always the same as the height of insertion for the bumpers or receiving parts which is ergonomically most advantageous for the operator.

SUMMARY OF THE INVENTION

In view of the above, an object of the present invention is to so design the punching and welding/bonding apparatus that the workpieces or other parts can be inserted into the holder under ergoconomically advantageous conditions.

A further object of the invention is to design the apparatus described above in such a way that the heightwise position of the holder can be selected substantially without regard for the shape of the bumpers or other workpieces.

Yet another problem of the invention is to make possible an ergonomical arrangement of the holder during insertion of the workpieces and substantially without regard for the geometry of the apparatus.

These and other objects of the invention are solved by an apparatus as defined above and being characterized in that the punching yoke is arranged to be stationary whereas the holder is fastened to a mounting which is mounted on the shuttle table and can be raised and lowered thereon transversely to the direction of movement thereof.

Above all, the invention brings with it the advantage that the heightwise settings for the correct insertion of the workpieces both in the punching yoke and in the welding or bonding station can be performed by a reciprocating arrangement which travels with and on the shuttle table and is responsible for raising and lowering the holder. The workpieces and receiving parts can therefore be inserted, where required, with the holder in a comparatively low heightwise position. It is also advantageous that the punching yokes and the welding or punching tools can be arranged in stationary positions, whereas all the movements required are performed by the holder and the workpieces fastened thereto, except of course the movements which occur as a result of the working strokes of the punch and the welding/bonding tools. The masses to be moved are, therefore, considerably smaller. One consequence of this is also considerable cost savings, because the punching yokes, the frame which holds them and the parts required for positioning the welding/bonding tools can, in particular, be made considerably simpler in design than hitherto. Also, the entire apparatus can be constructed in a considerably shorter form than hitherto.

Further advantageous features of the invention can be seen from the sub-claims.

BRIEF DESCRIPTION OF THE DRAWINGS

The invention will be explained in detail below by reference to an embodiment of an apparatus intended for punching and welding bumpers, in conjunction with the accompanying drawings. In the drawings.

DETAILED DESCRIPTION OF PREFERRED EMBODIMENTS OF THIS INVENTION

Figure 1:
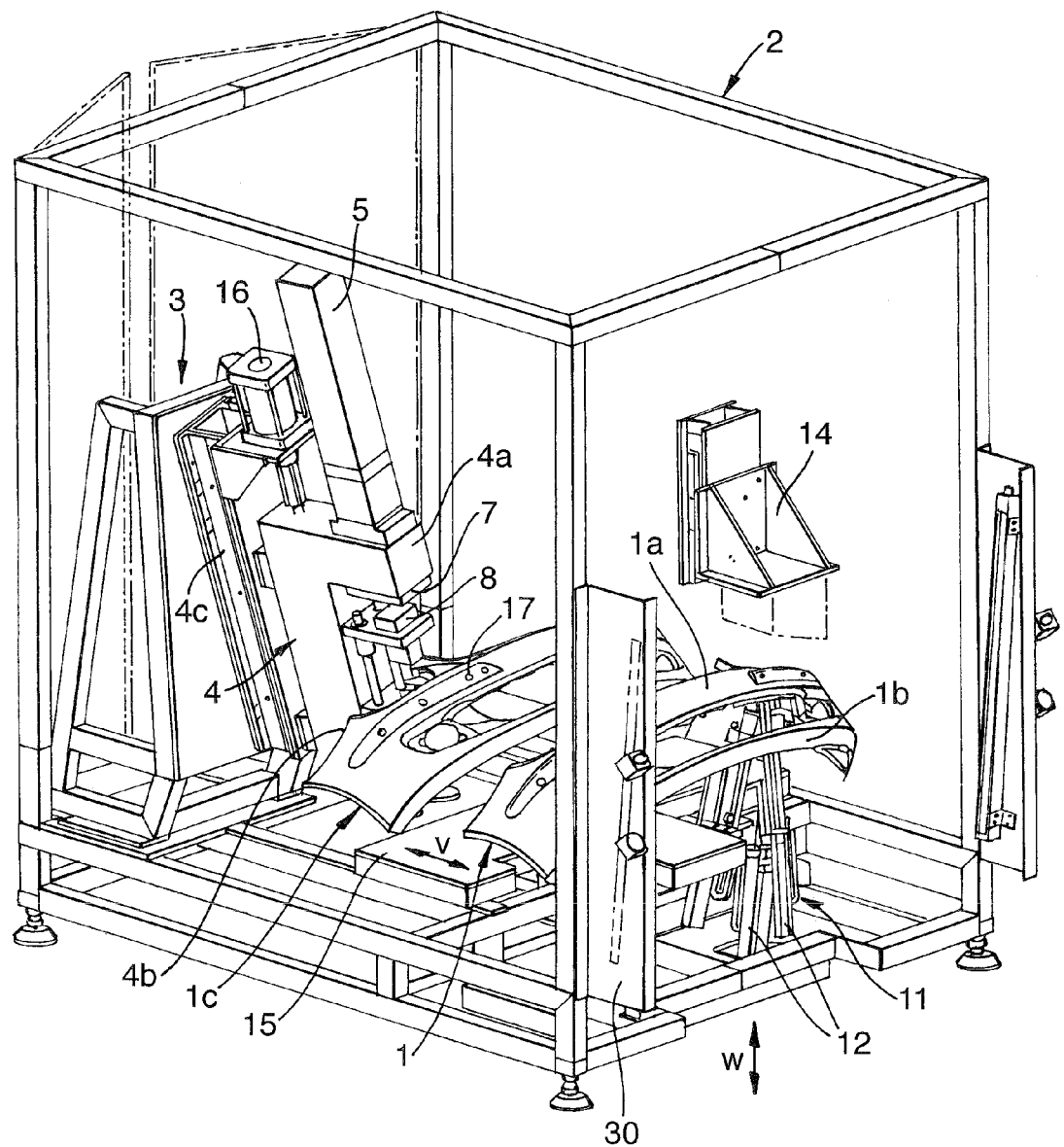
FIG. 1 is a schematic, perspective overall view showing a known apparatus for punching and welding workpieces.

In the embodiment shown, an apparatus for punching and welding is used for dealing with workpieces 1 in the form of bumpers for motor vehicles. When seen in cross-section and as is shown in particular in FIGS. 2 and 3, the bumpers have a U-shaped outline which is formed by a central longitudinal web 1a and side-walls 1b projecting therefrom. Apart from this, the workpiece 1 is of the arched shape characteristic of the bumpers of motor vehicles. The apparatus includes a frame 2 to which access is possible at least from the front end. Provided at a rear end of the frame 2 is a punching station 3. The latter has in particular a punching yoke 4 which is generally C-shaped and which carries on a top arm 4a a cylinder 5 preferably able to be actuated pneumatically and having a piston rod 6 (FIG. 2) being provided at its bottom end with a punch 7. At an end opposite from the arm 4a and the punch 7, the punching yoke 4 has a bottom arm 4b on which is formed a standard, schematically indicated die 8 which bears against the underside of the workpiece 1 from inside during the punching operation and is situated opposite the punch 7.

For greater clarity, only one punching yoke 4 is shown in FIG. 1. In fact however, there are generally at least two such punching yokes 4, and often even more than two, present at the punching station 3, which yokes differ from one another only in that their punching axes, which are defined by the reciprocating movement of the piston rods 6 and which are situated in radial positions relative to the arched curvature of the workpieces 1, are arranged at different angles in space.

Arranged at the front end of the apparatus is a welding station 11 which has a plurality of welding tools 12. In the embodiment, the welding station 11 is in the form of an ultrasonic welding arrangement and for this purpose it is provided with welding tools 12 in the form of oscillatory structures which are not shown in detail and which each have, as is known per se (e.g. from DE 100 46 451 A1), an electromechanical and preferably piezo-electric converter and a sonotrode connected thereto. The oscillatory structures are also coupled to one or more advancing means by means of which the sonotrodes can be brought up against the undersides of the workpieces 1 from below in order to perform a welding operation. An anvil 14, which is arranged to be movable vertically, may also be provided.

Provided in a central part of the frame 2 is a shuttle table 15. The table 15 is arranged between the punching station 3 and the welding station 11 and can be moved to and fro between these two stations 3, 11 in the direction of a double-headed arrow v. What is used as a drive in this case is for example an electric motor, and piston-and-cylinder arrangement or some other drive means. Mounted on the shuttle table 15 is a holder which is not shown in detail and to which one workpiece 1 at a time can be firmly and non-displaceably secured.

The way in which the known apparatus described operates is essentially as follows:

At the beginning of a processing operation, the shuttle table 15 is moved, by means of the drive associated with it, in the direction of arrow v to the front end of the frame 2, i.e. to the welding station 11. The operator then places a workpiece 1 on the holder and fastens it thereto. The welding tools then have to be moved downwards in the direction of a double-headed arrow w out of the region affected by the side-walls 1b of the workpiece 1. After this, the workpiece 1 is moved by the shuttle table 15 to the punching station 3 and to a position 1c. At this instant the punching yoke 4, which is mounted to be displaceable vertically in a slideway 4c arranged at the rear end of the frame 2 and which can be moved up and down by means of a reciprocating cylinder 16, has to be situated in a lowered position so that the workpiece 1 can enter the space between the die 8 and the punch 7 freely from position 1c. The punching yoke 4 is then raised by the reciprocating cylinder 16, as a result of which the die 8 is applied to the underside of the workpiece 1 so that the punching operation can then take place to form holes 17 in the workpiece 1.

On completion of the punching operation, the punching yoke 4 is lowered again, the shuttle table 15 is moved back to the welding station 12 and the workpiece 1 is arranged there with its downwardly open U-shaped space above the still lowered welding tools 12.

The receiving parts (not shown) which are to be inserted into the punched holes 17 were placed on delivery spigots (not shown), which are accommodated for example in recesses in the workpiece holder, before the workpiece 1 was inserted onto the holder. These delivery spigots are now advanced to introduce the receiving parts into the holes 17 and at the same time the anvil 14 is moved downwards. The welding tools 12 are then moved upwards in the direction of double-headed arrow w to connect the receiving parts to the workpiece 1 by welding. Following this, the finished workpiece 1 is lifted off the holder and replaced by a workpiece which has yet to be processed, whereupon the operations described are repeated.

The invention will now be described by means of an embodiment at present deemed the best one for carrying out the present invention.

Figure 2:
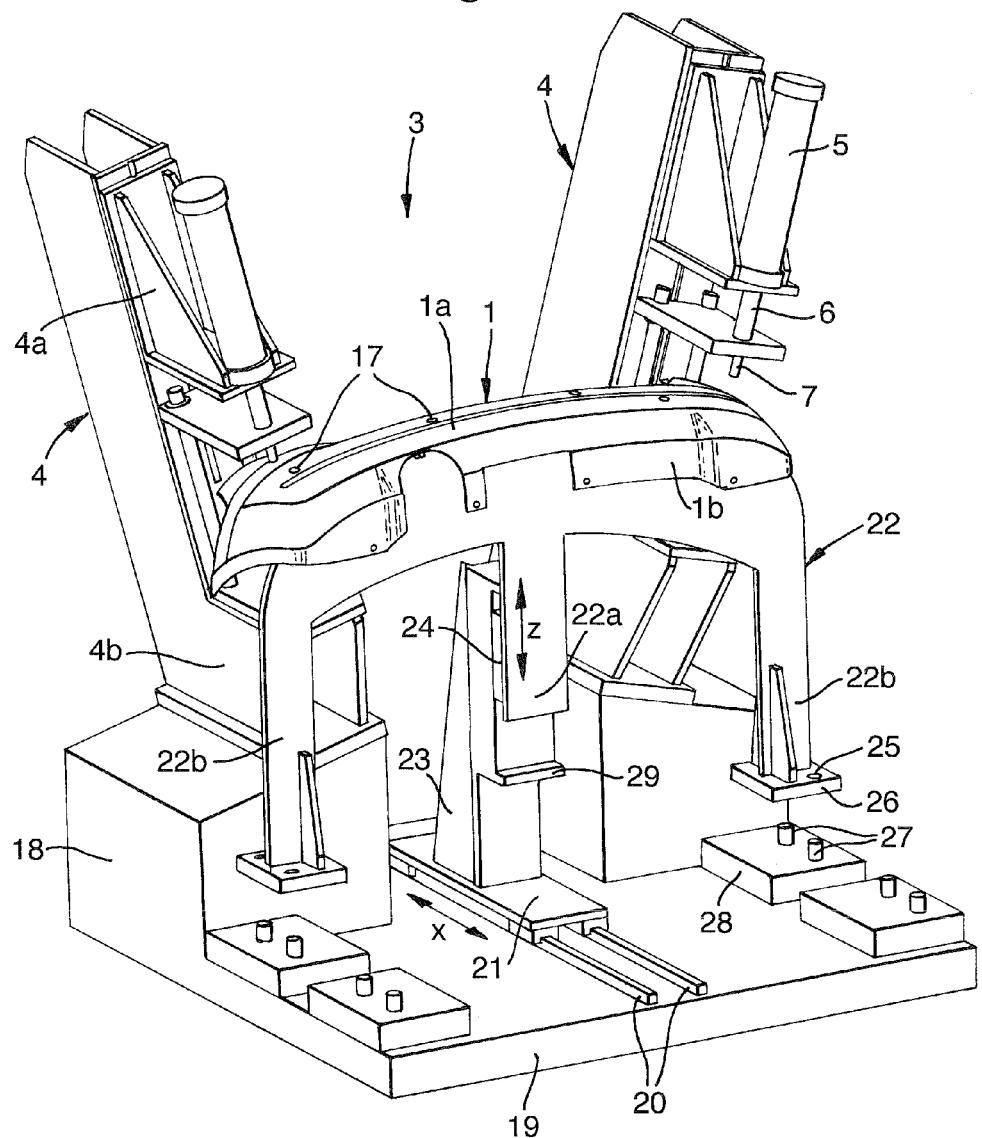
FIG. 2 is an enlarged perspective view of a punching station designed in accordance with the invention for the apparatus of FIG. 1.
Figure 3:
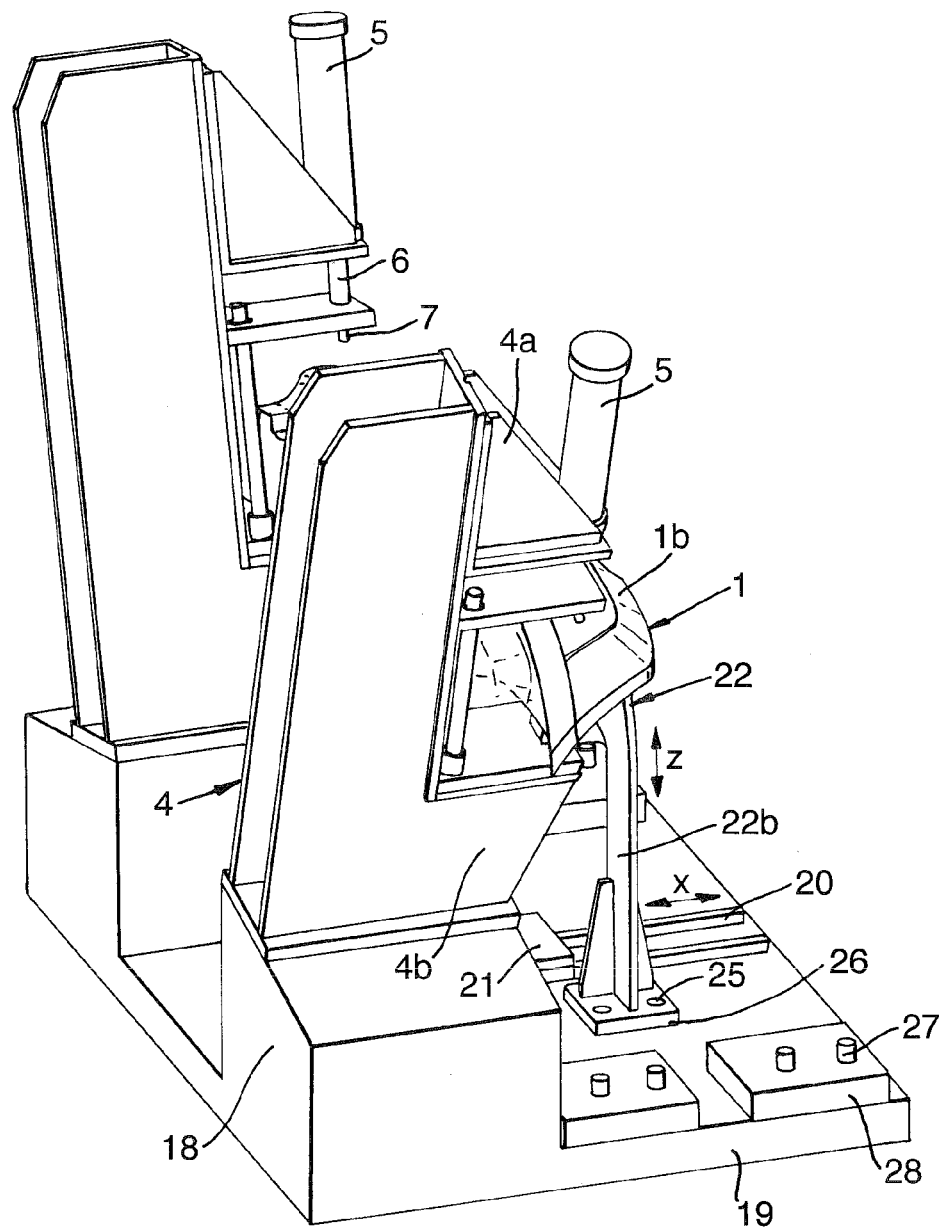
FIG. 3 is a view from the side of the punching station of FIG. 2, looking obliquely from the side and from the rear.

Shown in FIGS. 2 and 3 are essential parts of an apparatus according to the invention for punching and welding the workpieces 1, parts which are the same being given the same reference numerals as in FIG. 1.

An essential difference from FIG. 1 lies firstly in the fact that in the apparatus according to the invention the punching yokes 4 are all arranged to be stationary and are for example supported on stanchions or supports 18 arranged in the rear region of the frame 2 and provided on a base-plate 19 of the frame. Also provided, as FIGS. 2 and 3 show, in a central part of the base-plate 19 is a guide 20 for a shuttle table 21. The shuttle table 21 is arranged between the punching station 3 and a welding station (not shown) and can be moved to and fro between these two stations in the direction of a double-headed arrow x substantially in the same manner as described above with reference to FIG. 1. What is used as a drive in this case is for example, once again, an electric motor, and piston-and-cylinder arrangement or some other drive means. Mounted on the shuttle table 21 is a holder 22 (FIG. 2) which is preferably fastened to the top end of a column 23 which is mounted on the shuttle table 21 and is for example vertically arranged, the shuttle table 21 usefully being detachably connected to the column 23 to enable holders 22 matched to different workpieces 1 to be mounted on the shuttle table 21. The column 23 is preferably mounted in a central part of the holder 22, or rather the shuttle table 21, so that it cannot collide with the punching or welding tools 7, 12 (FIG. 1) in the course of the operation of the apparatus, which has yet to be described. The holder 22 is also provided with quick-action closures, vacuum suckers or the like (not shown) by means of which one workpiece 1 at a time can be firmly and non-displaceably secured in place on it. The shape of the holder 22 is also usefully matched to the shape of the workpieces 1.

In accordance with the invention, the holder 22 is mounted to be vertically displaceable, i.e. raisable and lowerable, on the shuttle table 21 and movable relative thereto in the direction of a double-headed arrow z (FIG. 2). For this purpose, the holder 22 usefully has a downwardly projected central tongue 22*a* which is fastened to a mounting 24 which is mounted to be displaceable in the column 23 in the direction of arrow z. What is used to displace the mounting 24 on the column 23 is a reciprocating arrangement (not shown in detail) which may comprise a pneumatic or hydraulic piston-and-cylinder arrangement, an electric motor or some other drive. The direction of movement of the mounting 24 is usefully transverse relative to the shuttle table 21 and preferably substantially vertical if the shuttle table 21 is movable horizontally.

The holder 22 is preferably provided at its ends, i.e. on both sides of the shuttle table 21, with legs 22*b* which have at their bottom ends aligning or locating elements 25 in the form of holes which are formed in plates 26 arranged transversely to the legs 22*b*. These aligning elements 25 co-operate with aligning elements 27 in the form of dowel or set pins which project perpendicularly from plates 28 which are fastened to the base-plate 19. At least one such plate 28 is preferably arranged in the punching station 3 as well as in the welding station (11 in FIG. 1), in such a way that it defines a preset position for the holder 22 when the latter's legs 22*b* are lowered in the given station and the aligning elements 25 are slid onto the aligning elements 27.

The way in which the apparatus according to the invention operates is essentially as follows:

As in the case of the known apparatus, the shuttle table 21 is first arranged in the region of the welding station (11 in FIG. 1) to allow a workpiece 1 to be inserted in the holder 22. For this, the operator can lower the holder 22 in the direction of the arrow z by means of the drive associated with the mounting 24 as far as is permitted by the stationary welding tools 12 (FIG. 1). Because the welding tools 12 only need to perform the usual working stroke and enter the space inside the U-shaped workpiece 1 in the course of the downward movement, they may be arranged at a very low level above the ground, which means that the holder 22 can be brought to a low-lying position which is advantageous for the fastening in place of the workpiece 1.

Once the workpiece 1 has been fastened in place, the holder 22 is raised by means of the mounting 24 until the welding tools 12 are out in the open and the workpiece 1 can be moved by the shuttle table 21 in the direction of arrow x to the punching station 3 without colliding with the welding tools 12. At the punching station 3, the die 8 (FIG. 1) is arranged in a correspondingly low position so that, when the holder 22 is raised, the side-walls 1*b* of the work-piece 1 can be moved over the die 8 without colliding with it until it is arranged in the centre of the U-shaped space in the workpiece 1. The latter is then lowered, by lowering the mounting 24 (arrow z), until its underside is resting on the die 8.

As the process continues, a punching operation is then performed with one or more punches 7, by actuating the corresponding punching cylinder 5, to provide the work-piece 1 with at least one of the holes 17.

On completion of the punching process, the movements described are performed in the reverse order. In particular, the holder 22 is raised until the die 8 is out in the open, and the shuttle table 21 is then moved to the welding station and finally the holder 22 is lowered again until its underside is close to and opposite the welding tools 12 (FIG. 1). By means of receiving spigots (not shown), suitable receiving parts are then introduced into the previously punched holes 17 and the anvil 14 is applied to the top side of the workpiece 1. The welding operation then takes place, as a result of the sonotrodes or the like being pressed against the workpiece 1 from below through their working stroke.

On completion of the welding operation, the finished workpiece 1 is removed, with the holder 22 still lowered, and a fresh workpiece 1 is placed on the holder 22, whereupon the steps of operation described are repeated.

The aligning elements 25, 27 (FIGS. 2 and 3) are so positioned relative to one another that they automatically engage with one another when the mounting 24, i.e. the holder 22, is lowered as soon as the shuttle table 21 has reached its correct position in the punching station 3 or welding station 11, respectively. In this way, the desired position preset for the punching or welding operation is defined, located and guaranteed in a positionally accurate way and with high repeatability. The positioning of the holder 22, or rather of the workpiece 1 situated thereon, which is achieved in this way makes possible comparatively inaccurate displacements or reciprocating movements, or ones which take place with large tolerances, during the phases of movement.

The processing height in the stations 3 and 11 may be different in the apparatus according to the invention. If for example, due to the overall height of the punching tools, the workpiece 1 needs to be positioned in the punching space at a level higher than the height of insertion at the welding station 11, the different height can readily be corrected by raising the holder 22. It is possible in this case for the plates 28 which are to be fitted in the punching station 3 to be arranged at a greater height in the machine frame 2 than in the region of the welding station 11 in order in this way to allow a stop 29 (FIG. 2), which is used to limit the stroke of the mounting 24, to be placed at a higher level, particularly when the raising and lowering of the mounting 24 is performed by means of a pneumatic cylinder or the like.

A particular advantage of the apparatus according to the invention lies in the fact that in place of the more than one reciprocating means which would otherwise be required for the punching yokes 4 and the welding tools 12, it is now only a single reciprocating means which travels with the shuttle table 21 which is required for the holder 22. As a result, the amounts of space required and the weight of the apparatus and material consumed for it are considerably reduced, which is also true of the related costs.

The invention is not limited to the embodiment described, which can be modified in a multiplicity of ways. In the first place, it is clear that the apparatus can be designed in a corresponding way if the connection of the receiving parts to the bumpers or the like is accomplished by bonding rather than by welding. Also, it is of course possible for workpieces other than bumpers to be punched, and connected to any items of equipment by welding/bonding, with the apparatus described. Further, the reciprocating arrangements which are described for the shuttle table 21 and the mounting 24 may be of designs other than those described. A reciprocating arrangement whose stroke is at least approximately 200 mm to 400 mm, or is at least of the depth of the U-shaped outline of the bumper or other internal outlines of workpieces, is preferably provided for the mounting 24 in this case, so that the apparatus is suitable for the depthwise dimensions of the cavities in all the workpieces which are of interest in the present case. Also, the apparatus according to the invention has only been described in a schematic form, omitting the usual controls such as switches, actuating buttons and the like and safety precaution such for example as light curtains 30 (FIG. 1) which are needed, because such parts are known per se. Finally, it is understood that the various features may also be used in combinations other than those shown and described.

It will be understood, that each of the elements described above or two or more together, may also find a useful application in other types of construction differing from the types described above.

While the invention has been illustrated and described as embodied in a device for punching and welding or bonding of workpieces, it is not intended to be limited to the details shown, since various modifications and structural changes may be made without departing in any way from the spirit of the present invention.

Without further analysis, the forgoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. Apparatus for punching and welding or bonding workpieces, comprising: a punching station having at least one punching yoke at which a die and a punch are provided, said punching yoke being stationary mounted; a welding or bonding station having at least one welding or bonding tool, and a shuttle table, able to be moved to and fro between said punching station and said welding or bonding station in a direction of movement; a mounting being mounted on said shuttle table to be raisable and lowerable thereon transversely to said direction of movement; and a holder which is fastenable to said mounting and is intended for the workpieces to rest solidly thereon.

2. Apparatus according to claim 1, wherein, except for working strokes required, said welding or bonding tools are arranged to be stationary in the welding or bonding station.

3. Apparatus according to claim 1, wherein said holder is detachably fastened to said mounting.

4. Apparatus according to claim 1 or 3, wherein said holder is mounted to be raisable and lowerable with a stroke of movement amounting to at least approximately 200 mm which corresponds at least to a depth of internal outlines of said workpieces.

5. Apparatus according to claim 1 wherein said holder is provided with legs and wherein at bottom ends of said legs aligning elements are provided which co-operate with aligning elements to be fastened on a base-plate.

6. Apparatus according to claim 5, wherein said aligning elements on said legs comprise holes and said aligning elements on said base-plate comprise dowel pins which enter said holes.

7. Apparatus according to claim 5 or 6, wherein said aligning elements can be fastened on said base-plate at positions defining a preset position for said holder in said punching station required for punching operations.

8. Apparatus according to claim 5 or 6, wherein said aligning elements can be fastened on said base-plate at positions defining a preset position for said holder in said welding or bonding station required for welding or bonding operations.

9. Apparatus according to claim 5 or 6, wherein first aligning elements can be fastened on said base-plate at positions defining a preset position for said holder in said punching station required for punching operations and wherein second aligning elements can be fastened on said base-plate at positions defining a preset position for said holder in said welding or bonding station required for welding or bonding operations.

* * * * *